(12) United States Patent
Baudin et al.

(10) Patent No.: US 12,197,182 B2
(45) Date of Patent: Jan. 14, 2025

(54) TOOL PART, SYSTEM, METHOD, AND A COMPUTER PROGRAM FOR DETERMINING A DIMENSION OF THE TOOL PART

(71) Applicant: SECO TOOLS AB, Fagersta (SE)

(72) Inventors: Micael Baudin, Fagersta (SE); Jan Gravningsbraten, Fagersta (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 17/922,745

(22) PCT Filed: Apr. 23, 2021

(86) PCT No.: PCT/EP2021/060674
§ 371 (c)(1),
(2) Date: Nov. 1, 2022

(87) PCT Pub. No.: WO2021/224028
PCT Pub. Date: Nov. 11, 2021

(65) Prior Publication Data
US 2023/0205162 A1    Jun. 29, 2023

(30) Foreign Application Priority Data
May 6, 2020  (EP) .................................. 20173171

(51) Int. Cl.
*G05B 19/12* (2006.01)
*G06K 7/10* (2006.01)
(52) U.S. Cl.
CPC ....... *G05B 19/128* (2013.01); *G06K 7/10366* (2013.01); *G05B 2219/25294* (2013.01)

(58) Field of Classification Search
CPC ........ G05B 19/128; G05B 2219/25294; G05B 2219/32049; G05B 19/4065; G06K 7/10366; Y02P 90/02
See application file for complete search history.

(56) References Cited

U.S. PATENT DOCUMENTS

2010/0087983 A1* 4/2010 Boss ...................... G06Q 10/20
701/31.4
2015/0105898 A1    4/2015 Adams et al.
(Continued)

FOREIGN PATENT DOCUMENTS

| EP | 2296102 A1 | 3/2011 |
| EP | 3543809 A1 | 9/2019 |
| JP | 2020044643 A | 3/2020 |

*Primary Examiner* — Jamara A Franklin
(74) *Attorney, Agent, or Firm* — Corinne R. Gorski (57) ABSTRACT

A system for utilizing an identification marker on a tool part for determining a dimension thereof. The system includes a reader device for reading a machine readable code, and an electronic device connected to the reader device. The electronic device has a processing circuitry that causes the system to detect with the reader device, an identification marker at a tool part, wherein the identification marker is a unique machine readable code read by the reader device, and the unique machine readable code of the identification marker, and obtain from the unique machine readable code, individual dimension information data including at least one individually measured dimension of the tool part measured when manufacturing the tool part. A method and a computer program product for utilizing an identification marker on a tool part to be used for determining a dimension of the tool part and to a tool part is also provided.

12 Claims, 7 Drawing Sheets

(56) References Cited

U.S. PATENT DOCUMENTS

2016/0271718 A1  9/2016  Fagan
2018/0039807 A1  2/2018  Obrien et al.

* cited by examiner

TOOL PART, SYSTEM, METHOD, AND A COMPUTER PROGRAM FOR DETERMINING A DIMENSION OF THE TOOL PART

RELATED APPLICATION DATA

This application is a § 371 National Stage Application of PCT International Application No. PCT/EP2021/060674 filed Apr. 23, 2021 with priority to EP 20173171.8 filed May 6, 2020.

TECHNICAL FIELD

The present disclosure relates to a tool part, system, method, and a computer program product for utilizing an identification marker on a tool part for determining a dimension of the tool part.

BACKGROUND ART

Today a plurality of machine operations involves use of tools. It is of importance that the tool used in the machine operation is at a desired location e.g. for an accurate processing of a material during the machine operation. Today there is a lot of manual handling of tools in machine operations.

One example of machine operations are operations by machines with cutting tools that are configured to remove chips from a piece of material during the machine operation by the cutting tool. In the example, the machine for cutting may require plural tool parts to be located at desired locations before starting the machine operation with the cutting tool parts. In the example, a cutting tool may comprise plural tool parts, e.g. a certain tool holder with one or more certain cutting inserts attached at the tool holder. Further, the cutting inserts may have plural cutting edges, and therefore each cutting insert may need to be arranged at the tool holder at a certain location e.g. so that a correct distance from the piece of material to the cutting edge is used during the machine operation by the cutting tool.

Often an operator of a machine needs to locate the tool part and verify that the tool part is at a desired location before the machine operation can start. In the example of a cutting tool, the operator of a cutting machine therefore needs to verify that e.g. the cutting edge of a cutting insert is at a desired location. This is often done by visual inspection and sometimes by manual measurements by the operator of the machine, before the machine operation can be started by the operator.

Today a large portion of the time in machine operations, in particular in multiple, complex consecutive machine operations, is therefore spent on localizing a tool part in relation to e.g. a machine and/or a material to be processed by the tool part when the tool is attached to the machine. This includes time spent on changes of tool parts in-between operations.

A first drawback of current approaches is that a cutting tool can be erroneously positioned and therefore located at an undesirable location so that an incorrect distance from the piece of material to the cutting edge of the cutting tool is used during the machine operation with the cutting tool, which in turn may cause severe damage to both the cutting tool but also to the piece of material.

A second drawback of current approaches is that even if the operator verifies that the tool part is located at a desirable location before the machine operation, the human error factor is one factor that can lead to an erroneously positioning of a tool part in a machine operation.

A third drawback of the current approaches is that a lot of time is spent on localizing a tool part in relation to e.g. a machine and/or a material to be processed by the tool part when the tool part is attached to the machine. This time is costly and adds time to total manufacturing process of a product.

SUMMARY

It is an object of some embodiments to solve or mitigate, alleviate, or eliminate at least some of the above or other drawbacks.

Today a dimension of a specific tool part can be documented as a dimension value +/− a certain tolerance value. Often when manufacturing a specific tool part, the manufacturing process itself cannot be that precise, and therefore each manufactured tool part will have a true dimension that is within a certain tolerance, i.e. within the certain tolerance value, of the desired dimension value.

This means that all individuals of a specific tool part have a dimension that is the dimension value +/− a certain tolerance value. This means that the true dimension for each individual tool part differ between the different individual tool parts due to the tolerance value.

This documented dimension can hence be used to some extent, but still the tolerance value will have to be measured for each individual tool part before the individual tool part is used e.g. in a machine operation. This means that time needs to be spent on e.g. verifying the exact dimension of the individual tool part.

The tool part can be e.g. a cutting insert, a cutting edge, a milling tool part, a drilling tool part, a drill chuck, a milling cutter chuck or a tool holder.

With the mentioned drawbacks above, there is therefore a demand for knowing the exact dimension of the specific individual tool part for minimizing time spent on e.g. localizing a tool part in relation to e.g. a machine and/or a material and for minimizing the risk of human errors when e.g. positioning a tool part at a certain location for processing in a machine operation.

Hence, there is a demand for alternative approaches for decreasing the risk of human errors and localizing a tool part in relation to e.g. a machine and/or a material.

The inventors have come up with a solution that decreases the risk of human errors and that can also reduce the time needed for verifying that a desired tool part is located at a desired location in relation to e.g. a machine and/or a material. In the following, aspects and embodiments will be presented where alternative approaches for decreasing the risk of human errors and localizing a tool part in relation to e.g. a machine and/or a material are described.

According to a first aspect there is provided a system for utilizing an identification marker on a tool part to be used for determining a dimension of the tool part, wherein the system comprises: a reader device for reading a machine readable code, an electronic device configured to be connected with the reader device, the electronic device having a processing circuitry configured to cause the system to, detect, by the reader device, an identification marker at a tool part wherein the identification marker is a unique machine readable code, read, by the reader device, the unique machine readable code of the identification marker, and obtain from the unique machine readable code, individual dimension information data comprising at least one individually measured dimension of the tool part as measured when manufacturing the tool part.

The identification marker can be e.g. a proprietary machine readable code, an open source machine readable code, a two dimensional code, a three dimensional code, an image a Quick Response code, a High Capacity Colored Two Dimensional Code, a European Article Number code, a Data Matrix code or a MaxiCode.

According to some embodiments, the identification marker is etched at the tool part. According to some embodiments the identification marker is a sticker attached at the tool part. According to some embodiments the identification marker painted at the tool part.

One advantage with this aspect is that an individual dimension, as measured when manufacturing the individual tool part, can be obtained and used during usage of the individual tool part e.g. at a tool part customer, which eliminates e.g. the need for measuring the individual dimension of the tool part at a later point in time, as needed with a tool part only associated with a dimension value +/− a certain tolerance value, e.g. before or during usage of the tool part in a machine operation at a tool part customer, which in turn saves time, improves measurement accuracy and reduces measurement errors caused by e.g. a human operator.

According to some embodiments, the processing circuitry is further configured to cause the system to obtain machine dimension information data comprising at least a first assembly dimension defining a relation of the tool part to a machine when the tool part is attached to the machine.

One advantage with this embodiment is that with dimension information relating to the machine, an individual dimension of the tool part can be used in combination with a known dimension that is related to the machine when the tool part is assembled at the machine.

According to some embodiments the processing circuitry is further configured determine a first assembly dimension of the tool part in relation to the machine, based on the individual dimension information data and the machine dimension information data.

One advantage with this embodiment is that an individual dimension of the tool part can be used in combination with a known dimension that is related to the machine in order to determine a first assembly dimension of the tool part in relation to the machine, e.g. the position of the tool part in relation to the machine.

According to some embodiments the processing circuitry is further configured to cause the system to detect, by the reader device, a first identification marker at a first tool part and a second identification marker at a second tool part, read, by the reader device, the unique machine readable code of the first identification marker and the unique machine readable code of the second identification marker, obtain from the unique machine readable code of the first identification marker a first individual dimension information data comprising at least one individually measured dimension of the first tool part as measured when manufacturing the first tool part, and obtain from the unique machine readable code of the second identification marker a second individual dimension information data comprising at least one individually measured dimension of the second tool part as measured when manufacturing the second tool part, and determine a second assembly dimension of the first tool part and the second tool part, based on the first individual dimension information data and the second individual dimension information data.

One advantage with this embodiment is that an assembly dimension of the first tool part and the second tool part can be determined, e.g. when the first tool part is attached to the second tool part.

According to some embodiments the processing circuitry is further configured to cause the system to obtain machine dimension information data comprising at least a first assembly dimension defining a relation of the first tool part to a machine and a second assembly dimension defining a relation of the second tool part to the machine when the first tool part is attached to the second tool part and the second tool part is attached to the machine, and determine a third assembly dimension of the first tool part and the second tool part in relation to the machine, based on the first individual dimension information data, the second individual dimension information data and the machine dimension information data.

One advantage with this embodiment is that an assembly dimension of the first tool part and the second tool part in relation to a machine can be determined when the first tool part is attached to the second tool part, and the second tool part is attached to the machine to e.g. determine a distance from a known reference point or axis of the machine to an edge of the first tool part.

According to some embodiments, the individual dimension information data is obtained by decoding the unique machine readable code of the identification marker and from the decoded information obtain the individual dimension information data.

One advantage with this embodiment is that information about the individual dimension can be coded and stored in the unique machine readable code itself that is available on the tool part.

According to some embodiments, the individual dimension information data is obtained by comparing the unique machine readable code with association data comprising individual dimension information data of the tool part provided with the unique machine readable code and obtaining the individual dimension information data from a memory.

One advantage with this embodiment is that information about the individual dimension can be stored in a memory that e.g. is a remote memory, and the information data can be stored and managed by a tool part manufacturer for a tool part customer.

According to a second aspect there is provided a method for utilizing an identification marker on a tool part to be used for determining a dimension of the tool part. The method comprising the step of detecting, by a reader device, an identification marker at a tool part wherein the identification marker is a unique machine readable code. The method further comprising the step of reading, by the reader device, the unique machine readable code of the identification marker, and the step of obtaining from the unique machine readable code individual dimension information data comprising at least one individually measured dimension of the tool part as measured when manufacturing the tool part.

One advantage with this aspect is that an individual dimension, as measured when manufacturing the individual tool part, can be obtained and used during usage of the individual tool part e.g. at a tool part customer, which eliminates e.g. the need for measuring the individual dimension of the tool part at a later point in time, as needed with a tool part only associated with a dimension value +/− a certain tolerance value, e.g. before or during usage of the tool part in a machine operation at a tool part customer, which in turn saves time, improves measurement accuracy and reduces measurement errors caused by e.g. a human operator.

According to some embodiments, the method further comprises the step of obtaining machine dimension information data comprising at least a first assembly dimension defining a relation of the tool part to a machine when the tool part is attached to the machine.

One advantage with this embodiment is that with dimension information relating to the machine, an individual dimension of the tool part can be used in combination with a known dimension that is related to the machine when the tool part is assembled at the machine.

According to some embodiments, the method further comprises the step of determining a first assembly dimension of the tool part in relation to the machine, based on the individual dimension information data and the machine dimension information data.

One advantage with this embodiment is that an individual dimension of the tool part can be used in combination with a known dimension that is related to the machine in order to determine a first assembly dimension of the tool part in relation to the machine, e.g. the position of the tool part in relation to the machine.

According to some embodiments, the method further comprises, detecting, by the reader device, a first identification marker at a first tool part and a second identification marker at a second tool part, reading, by the reader device, the unique machine readable code of the first identification marker and the unique machine readable code of the second identification marker, obtaining from the unique machine readable code of the first identification marker a first individual dimension information data comprising at least one individually measured dimension of the first tool part as measured when manufacturing the first tool part, and obtaining from the unique machine readable code of the second identification marker a second individual dimension information data comprising at least one individually measured dimension of the second tool part as measured when manufacturing the second tool part, and determining a second assembly dimension of the first tool part and the second tool part, based on the first individual dimension information data and the second individual dimension information data.

One advantage with this embodiment is that an assembly dimension of the first tool part and the second tool part can be determined, e.g. when the first tool part is attached to the second tool part.

According to some embodiments, the method further comprises obtaining machine dimension information data comprising at least a first assembly dimension defining a relation of the first tool part to a machine and a second assembly dimension defining a relation of the second tool part to the machine when the first tool part is attached to the second tool part and the second tool part is attached to the machine, and determining a third assembly dimension of the first tool part and the second tool part in relation to the machine, based on the first individual dimension information data, the second individual dimension information data and the machine dimension information data.

One advantage with this embodiment is that an assembly dimension of the first tool part and the second tool part in relation to a machine can be determined when the first tool part is attached to the second tool part, and the second tool part is attached to the machine to e.g. determine a distance from a known reference point or axis of the machine to an edge of the first tool part.

According to some embodiments, the individual dimension information data is obtained by decoding the unique machine readable code of the identification marker and from the decoded information obtaining the individual dimension information data, and/or by comparing the unique machine readable code with association data comprising individual dimension information data of the tool part provided with the unique machine readable code and obtaining the individual dimension information data from a memory.

One advantage with this embodiment is that information about the individual dimension can be coded and stored in the unique machine readable code itself that is available on the tool part.

One advantage with that information about the individual dimension is stored in a memory $103a, 103b, 103c$, that is e.g. a remote memory $103c$, is that the individual dimension can be managed by a tool part manufacturer for a tool part customer.

According to a third aspect there is provided a computer program product comprising a non-transitory computer readable medium, having thereon a computer program comprising program instructions, the computer program being loadable into a processing circuitry and configured to cause execution of the method when the computer program is run by the processing circuitry.

According to a fourth aspect there is provided a tool part for a cutting tool comprising an identification marker arranged at the tool part wherein the identification marker is a unique machine readable code comprising individual dimension information data, wherein the individual dimension information data comprises at least one individually measured dimension of the tool part as measured when manufacturing the tool part, and wherein the machine readable code is configured to be read by a reader device and decoded by an electronic device configured to be in communication with the reader device.

One advantage with this aspect is that each individual tool part is provided with a unique machine readable code comprising individual dimension information data for that specific tool part. This eliminates e.g. the need for measuring the dimension of the tool part at a later point in time e.g. during usage of the tool part in a machine operation, which in turn saves time and reduces measurement errors caused by e.g. a human. A further advantage is that the individual dimension information data can be obtained by a device which enables usage of the individual dimension information data by e.g. a machine and at the same time limits the need for human interaction which minimizes the risk of human errors.

Effects and features of the second through fourth aspects are to a large extent analogous to those described above in connection with the first aspect. Embodiments mentioned in relation to the first aspect are largely compatible with the second through fourth aspects.

The present disclosure will become apparent from the detailed description given below. The detailed description and specific examples disclose preferred embodiments of the disclosure by way of illustration only. Those skilled in the art understand from guidance in the detailed description that changes, and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Example tool parts for use in a machine operation will now be described for illustrative purpose, to visualize and exemplify the prior art and the aspects of the disclosure. It is understood that the aspects of the disclosure can be applied to any tool part in any machine operation.

In the example, and in the following description, tool parts for cutting are disclosed. Example machine operations are related to machines with cutting tools that are used to remove chips from a piece of material during the machine operation. Piece of material, as described herein, may typically comprise a work piece of metal to be processed, but the material may be any other material such as a plastic, stone or wood material. Machines, as described herein, may typically comprise a milling machine, a turning machine, a hole making machine, a threading machine or any other machine configured for processing a piece of material by a tool part.

Figure 1:
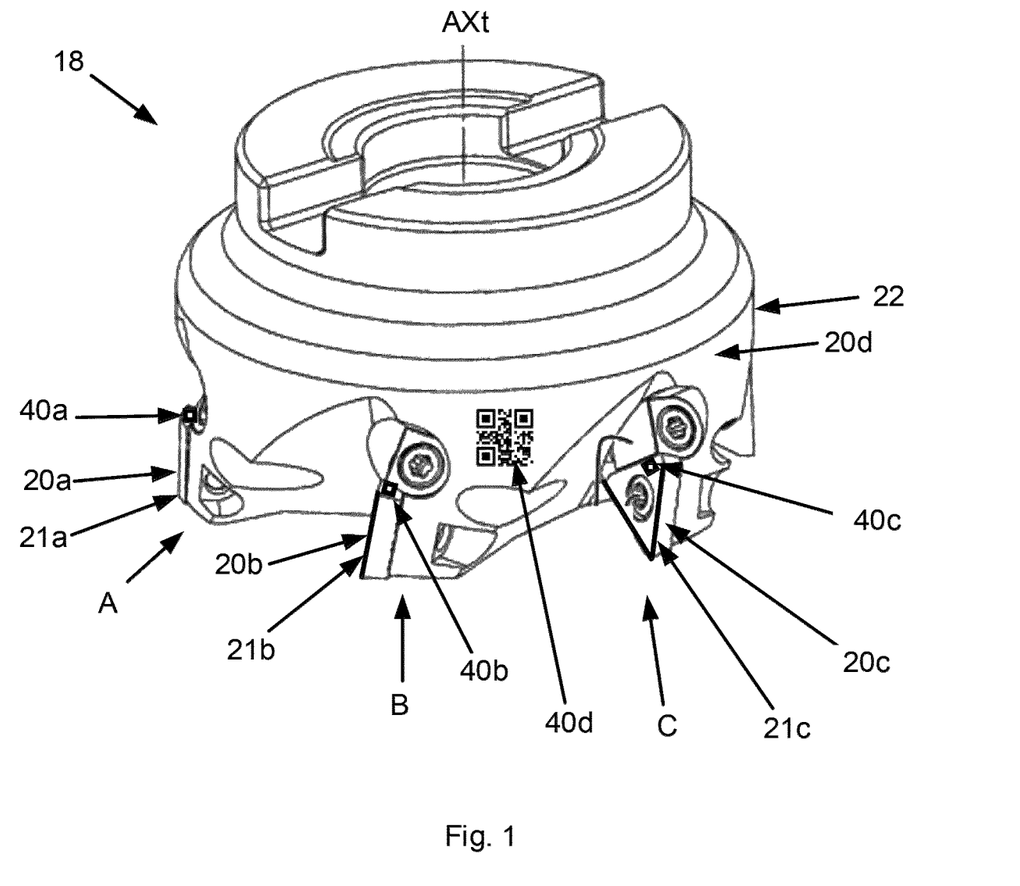
FIG. 1 illustrates example tool parts according to an embodiment of the present disclosure.

FIG. 1 illustrates example tool parts 20a,20b,20c,20d of a cutting tool 18. In the example, as illustrated in FIG. 1, the tool parts 20a,20b,20c are cutting inserts 21a,21b,21c and the tool part 20d is a tool holder 22. In the example the tool holder 22 is arranged to receive the cutting inserts 21a,21b, 21c, at locations at the tool holder 22 illustrated as positions "A", "B" and "C" respectively.

Figure 2:
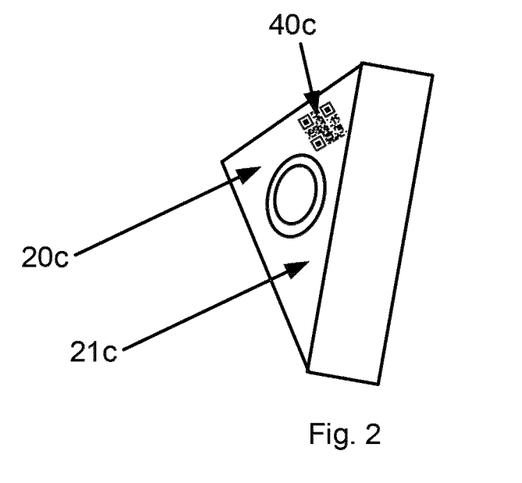
FIG. 2 illustrates an example tool part in form of a cutting insert with at least one cutting edge according to an embodiment of the present disclosure.

Further, in the example as illustrated in FIG. 1 each cutting insert 21a,21b,21c, comprising at least one cutting edge. FIG. 2 illustrates an example tool part 20c in form of a cutting insert 21c with at least one cutting edge. In the example, with reference to FIG. 1 and FIG. 2, each cutting edge of each cutting insert 21a,21b,21c, is configured to be used for removing chips from a piece of material.

Often an operator of a machine needs to locate the tool part 20a,20b,20c,20d and verify that the tool part 20a,20b, 20c,20d is at a desired location before the machine operation can start. In the example of a cutting tool 18, as illustrated in FIG. 1, the operator of a cutting machine therefore needs to verify that e.g. the cutting edge of a cutting insert 21a,21b,21c is at a desired location. This is often done by visual inspection and sometimes by manual measurements by the operator of the machine, before the machine operation can be started by the operator.

Today e.g. the distance from the tool holder rotation axis, AXt, as illustrated in FIG. 1, to each cutting edge of each cutting insert 21a,21b,21c may be determined by manual measurement by an operator of a machine. In another example an operator of a machine lets the cutting edge come in contact with the piece of material before starting the machine operation in order to locate the cutting edge at a certain position in relation to the piece of material and e.g. determine the distance from the tool holder rotation axis AXt to the cutting edge of the cutting insert 21a,21b,21c.

As mentioned above, a first drawback of current approaches is that a cutting tool 18 can be erroneously positioned and therefore located at an undesirable location so that an incorrect distance from the piece of material to the cutting edge of the cutting insert 21a,21b,21c is used during the machine operation with the cutting tool 18, which in turn may cause severe damage to both the cutting tool 18 but also to the piece of material.

As mentioned above, a second drawback of current approaches is that even if the operator verifies that the tool part 20a,20b,20c,20d is located at a desirable location before the machine operation, the human error factor is one factor that can lead to an erroneously positioning of a tool part 20a,20b,20c,20d in a machine operation.

As mentioned above, a third drawback of the current approaches is that a lot of time is spent on localizing a tool part 20a,20b,20c,20d in relation to e.g. a machine and/or a material to be processed by the tool part 20a,20b,20c,20d when the tool part 20a,20b,20c,20d is attached to the machine. This time is costly and adds time to total manufacturing process of a product.

It is an object of some embodiments to solve or mitigate, alleviate, or eliminate at least some of the above or other drawbacks.

Today a dimension of a specific tool part can be documented as a dimension value +/− a certain tolerance value. Often when manufacturing a specific tool part, the manufacturing process itself cannot be that precise, and therefore each manufactured tool part will have a true dimension that is within a certain tolerance, i.e. within the certain tolerance value, of the desired dimension value.

This means that all individuals of a specific tool part have a dimension that is the dimension value +/− a certain tolerance value. This means that the true dimension for each individual tool part differ between the different individual tool parts due to the tolerance value.

This documented dimension can hence be used to some extent, but still the tolerance value will have to be measured for each individual tool part before the individual tool part is used e.g. in a machine operation. This means that time needs to be spent on e.g. verifying the exact dimension of the individual tool part.

With the mentioned drawbacks above, there is therefore a demand for knowing the exact dimension of the specific individual tool part for minimizing time spent on e.g. localizing a tool part in relation to e.g. a machine and/or a material and for minimizing the risk of human errors when e.g. positioning a tool part at a certain location for processing in a machine operation.

Hence, there is a demand for alternative approaches for decreasing the risk of human errors and localizing a tool part in relation to e.g. a machine and/or a material. The inventors have come up with a solution that decreases the risk of human errors and that can also reduce the time needed for verifying that a desired tool part is located at a desired location in relation to e.g. a machine and/or a material. In the following, aspects and embodiments will be presented where alternative approaches for decreasing the risk of human errors and localizing a tool part in relation to e.g. a machine and/or a material are described.

Referring again to FIG. 1 which illustrates example tool parts 20a,20b,20c,20d according to an embodiment of the present disclosure.

The first aspect of this disclosure shows a tool part 20a,20b,20c,20d for a cutting tool 18. According to some embodiments the tool part 20a,20b,20c,20d is any of a cutting insert, a cutting edge, a milling tool part, a drilling tool part, a drill chuck, a milling cutter chuck or a tool holder. The tool part 20a,20b,20c,20d comprising an identification marker 40a,40b,40c,40d arranged at the tool part 20a,20b,20c,20d.

According to some embodiments, the identification marker 40a,40b,40c,40d is at least any of, or a combination of at least any of, a proprietary machine readable code, an open source machine readable code, a two dimensional code, a three dimensional code, an image a Quick Response code, a High Capacity Colored Two Dimensional Code, a European Article Number code, a DataMatrix code or a MaxiCode.

According to some embodiments, the identification marker 40a,40b,40c,40d is etched at the tool part 20a,20b, 20c,20d. According to some embodiments the identification marker 40a,40b,40c,40d is a sticker attached at the tool part 20a,20b,20c,20d. According to some embodiments the identification marker 40a,40b,40c,40d painted at the tool part 20a,20b,20c,20d.

The identification marker 40a,40b,40c,40d is a unique machine readable code associated with individual dimension information data idID, wherein the individual dimension information data idID comprises at least one individually measured dimension of the tool part 20a,20b,20c,20d as measured when manufacturing the tool part 20a,20b,20c, 20d. In other words, each identification marker 40a,40b,40c, 40d at each tool part 20a,20b,20c,20d is unique so that no other tool part 20a,20b,20c,20d will have the very same identification marker 40a,40b,40c,40d. This enables the identification marker 40a,40b,40c,40d to be associated with individual dimension information data idID.

According to some embodiments the individual dimension information data idID comprises at least one individually measured dimension of the tool part 20a,20b,20c,20d as measured at a certain tool part temperature when manufacturing the tool part 20a,20b,20c,20d. According to some embodiments the individually measured dimension of the tool part 20a,20b,20c,20d is a dimension at a certain temperature. In an example, the dimension of the tool part may vary dependent on the temperature of the tool part, e.g. the tool part may expand at a higher temperature.

According to some embodiments, the individually measured dimension is measured automatically by a measuring machine and/or manually by a measuring tool by an operator.

Hence, with this embodiment each individual tool part is provided with a unique machine readable code which in turn can be associated with individual dimension information data idID for that specific individual tool part. This eliminates e.g. the need for measuring the dimension of the tool part 20a,20b,20c,20d at a later point in time e.g. during usage of the tool part in a machine operation, which in turn saves time and reduces measurement errors caused by e.g. a human.

According to some embodiments, the tool part 20a,20b, 20c,20d is a cutting insert 21a,21b,21c and the individual dimension information data idID comprises at least one individually measured dimension of the cutting insert 21a, 21b,21c as measured when manufacturing the cutting insert 21a,21b,21c.

FIG. 2 illustrates an example tool part 20c in form of a cutting insert 21c with at least one cutting edge according to an embodiment of the present disclosure. As illustrated in FIG. 2, the example tool part 20c comprising an identification marker 40c arranged at the tool part 20c.

Figure 3A:
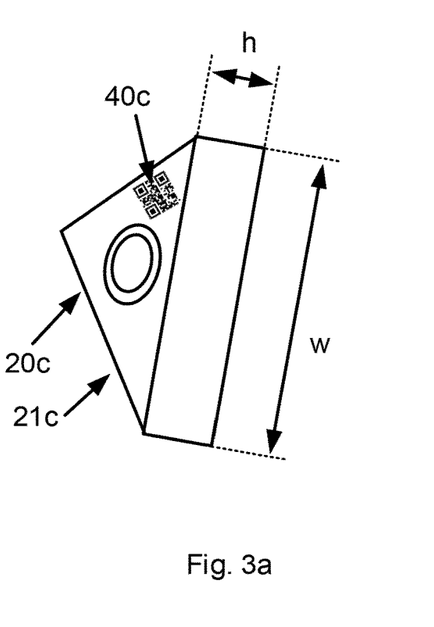
FIGS. 3a-3c illustrates example individual dimensions of different tool parts according to embodiments of the present disclosure.
Figure 3B:
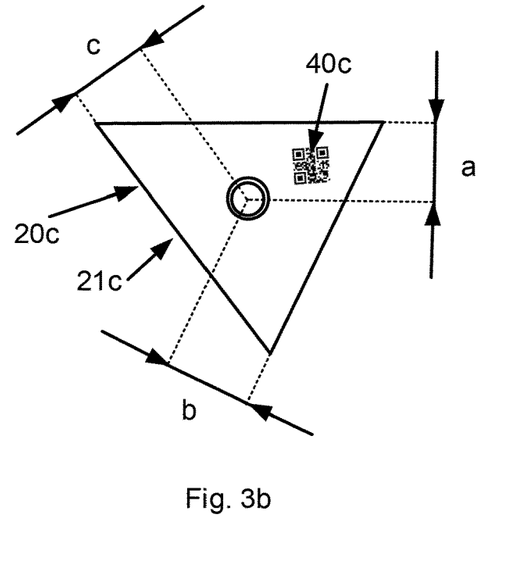

FIGS. 3a-3b illustrate example individual dimensions of the cutting insert 21c according to an embodiment of the present disclosure. In FIG. 3a the height h and the width w are illustrated. In FIG. 3b the dimension "a" from the centre of the cutting insert 21c to a first cutting edge of the cutting insert 21c is illustrated. In FIG. 3b the dimension "b" from the centre of the cutting insert 21c to a second cutting edge of the cutting insert 21c is illustrated. In FIG. 3b the dimension "c" from the centre of the cutting insert 21c to a third cutting edge of the cutting insert 21c is illustrated.

Figure 3C:
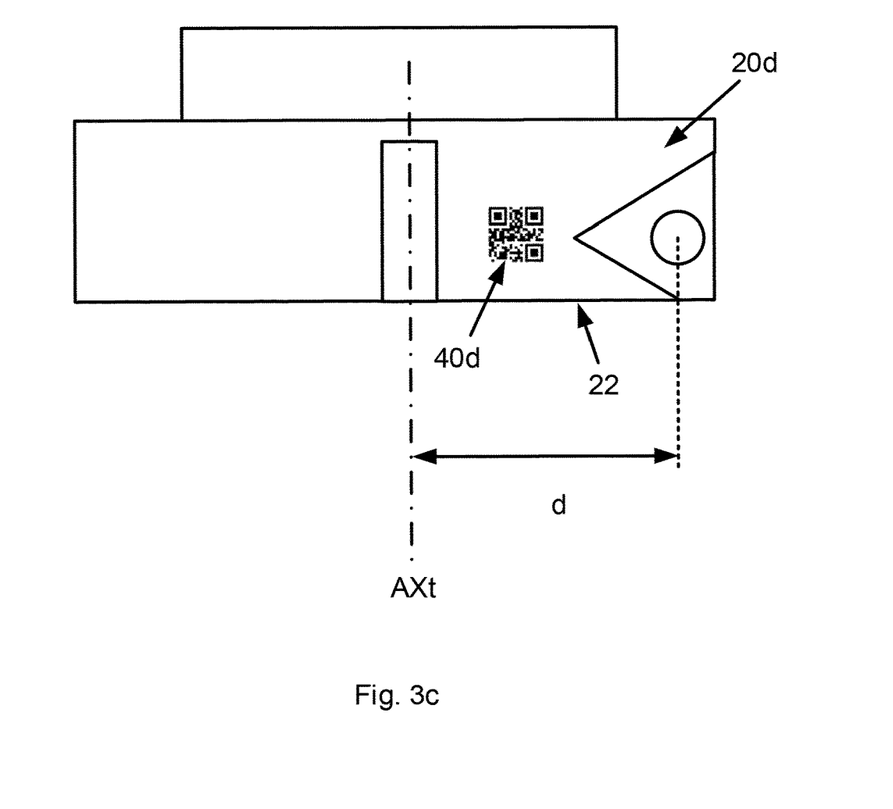

FIG. 3c illustrates example individual dimensions of a tool part 20d according to an embodiment of the present disclosure. As illustrated in FIG. 3c, the example tool part 20d comprises an identification marker 40d arranged at the tool part 20d. The tool part 20d in the example in FIG. 3c is a tool holder 22. In FIG. 3c the dimension "d" from the centre of a tool holder axis AXt of the tool holder 22 to the centre of a cutting insert attachment point, configured to receive a cutting insert 21a,21b,21c, is illustrated.

Figure 4:
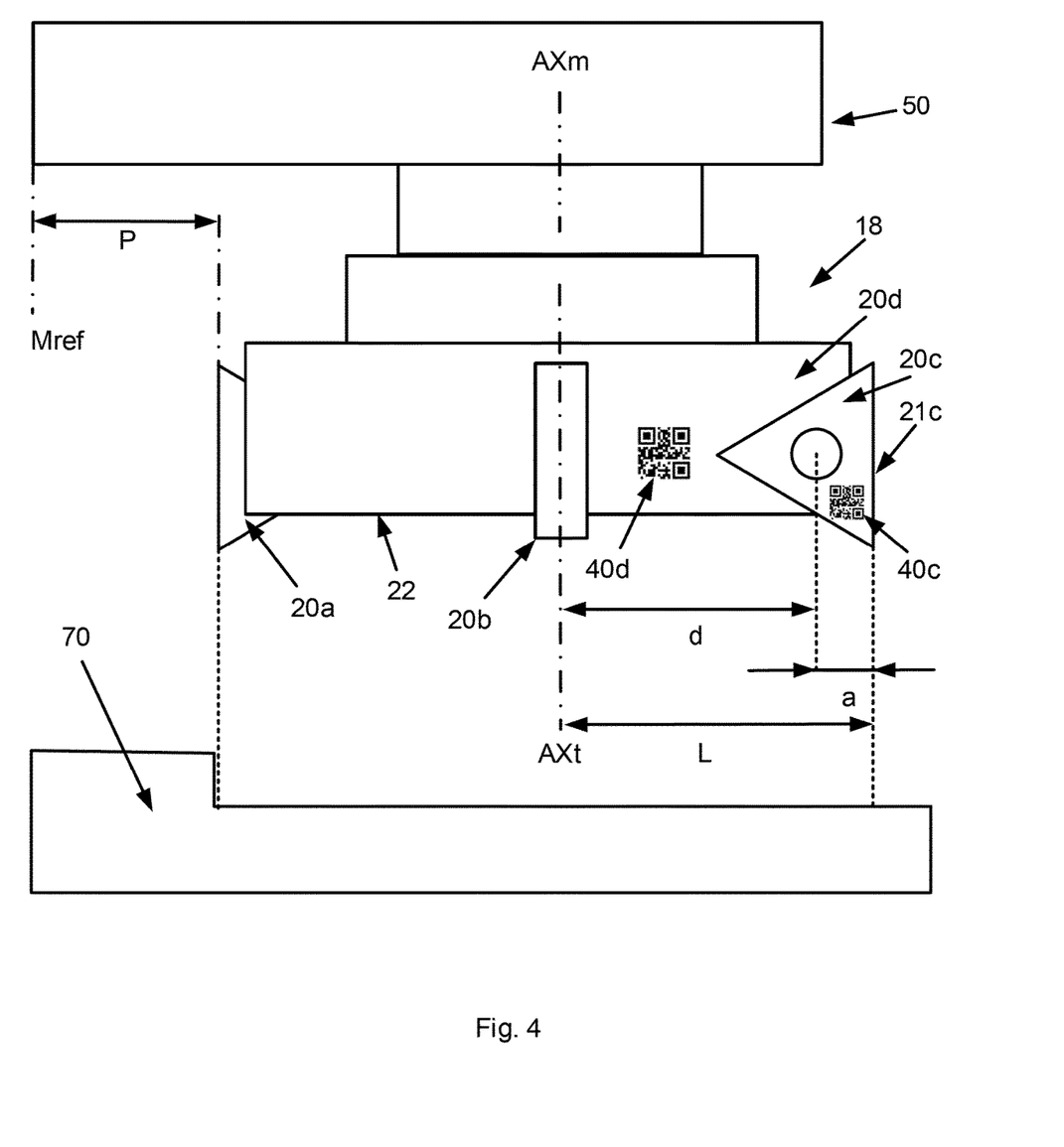
FIG. 4 illustrates example assembled tool parts attached to a machine according to an embodiment of the present disclosure.

FIG. 4 illustrates example assembled tool parts 20a,20b, 20c,20d attached to a machine 50 according to an embodiment of the present disclosure. In FIG. 4 the dimension "a" from the centre of the cutting insert 21c to a first cutting edge of the cutting insert 21c is illustrated together with the dimension "d" from the centre of a tool holder axis AXt of the tool holder 22 to the centre of an cutting insert attachment point for illustrating two dimensions with a common measurement point.

Hence, with this embodiment an individually measured dimension of that specific cutting insert 21c, as measured when manufacturing the cutting insert 21c, can be used during e.g. a manufacturing process for a faster and more reliable positioning of the cutting insert 21c e.g. in relation to a piece of material to be processed in a machine operation.

According to some embodiments, the individual dimension information data idID is coded in the machine readable code and the machine readable code is configured to be read by a reader device 10a,10b,10c and decoded by an electronic device 1a,1b,1c configured to be in communication with the reader device 10a,10b,10c.

Hence, with this embodiment individual dimension information data can be obtained by a device which enables usage of the individual dimension information data by e.g. a machine and at the same time limits the need for human interaction which minimizes the risk of human errors.

Figure 5A:
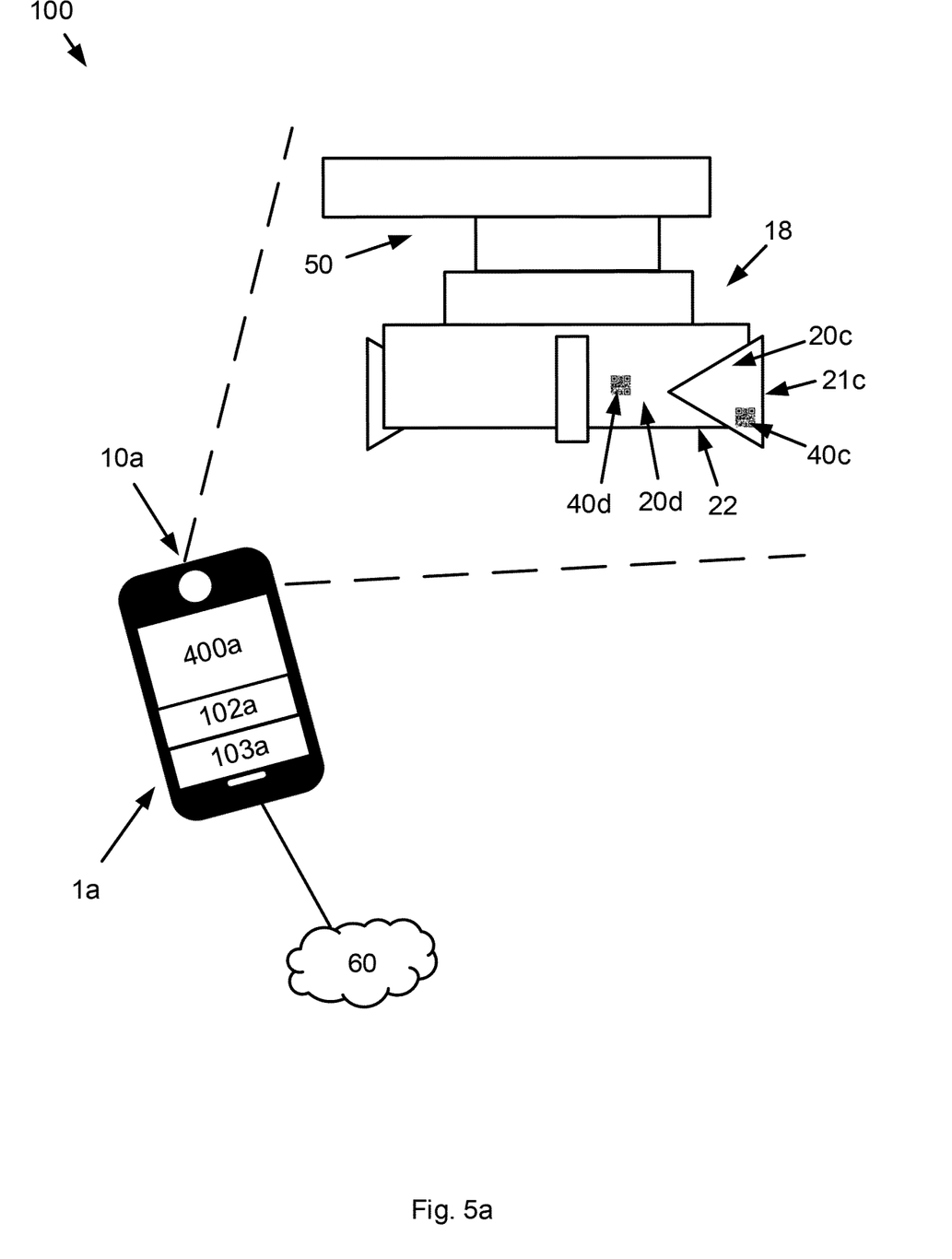
FIG. 5a-5c each illustrate an example system according to embodiments of the present disclosure.
Figure 5B:
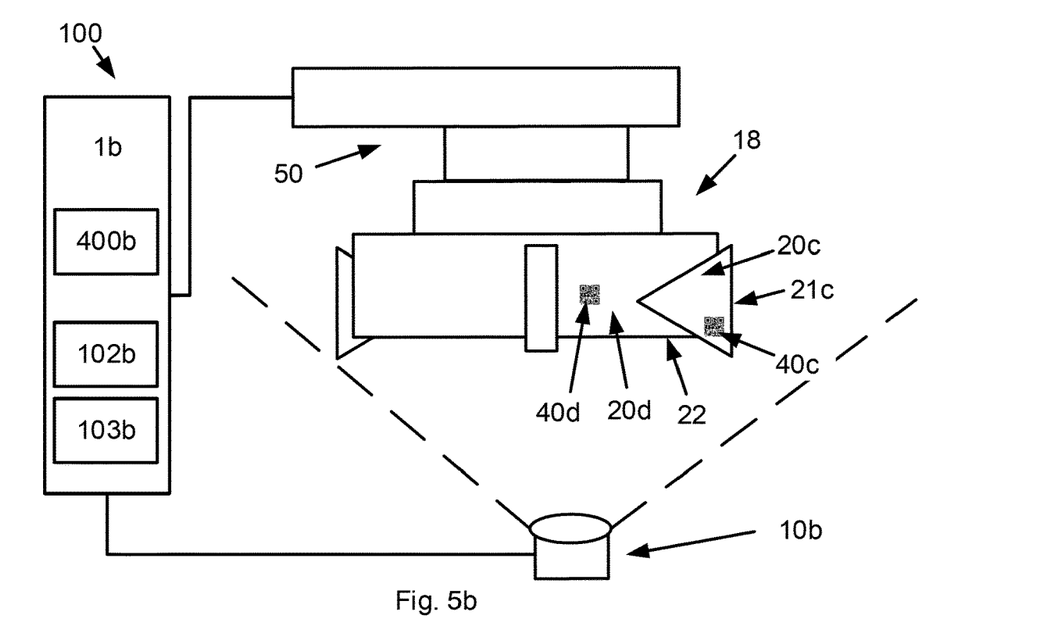
Figure 5C:
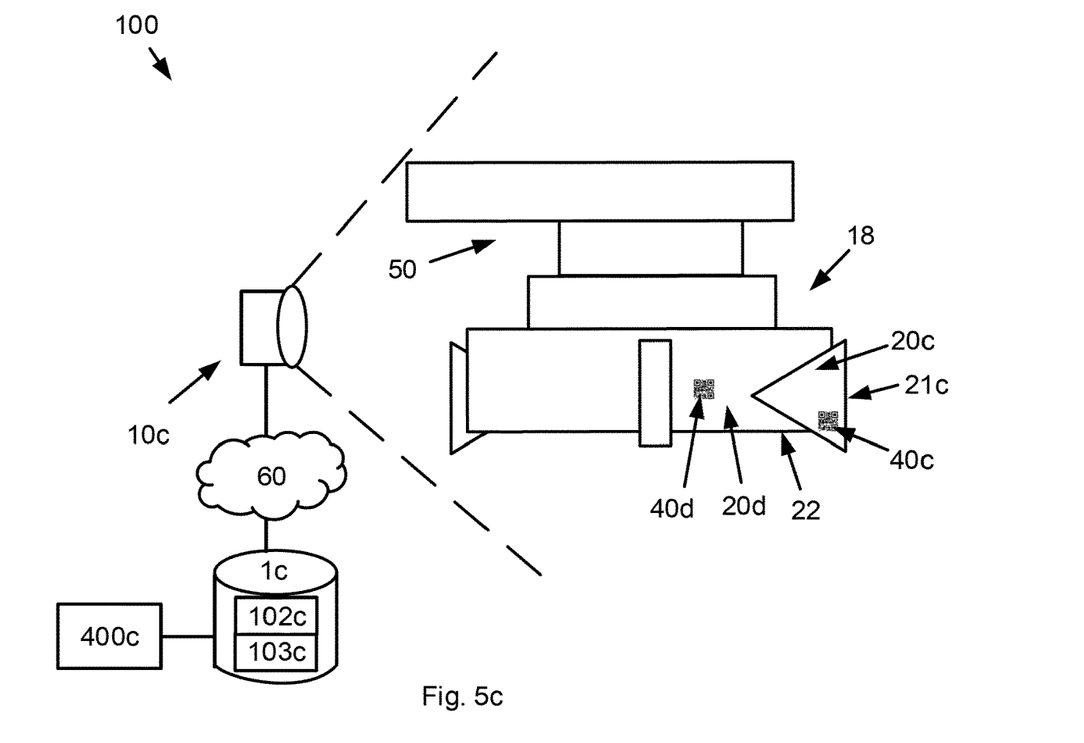

FIG. 5a-5c each illustrates an example system according to an embodiment of the present disclosure. The system 100 comprises a reader device 10a,10b,10c for reading a machine readable code. According to some embodiments, the reader device 10a,10b,10c is any of a camera based reader, a video camera reader, a pen-type reader with photodiodes, a laser scanner, a charge-coupled device reader or a cell phone camera. According to some embodiments, the reader device 10a,10b,10c is a component integrated in an electronic device a stand-alone component. The reader device 10a,10b,10c is configured for reading a machine readable code, arranged at a tool part 20a,20b,20c,20d, during usage of the tool part 20a,20b,20c,20d in a machine operation by a machine 50.

The system 100 further comprises an electronic device 1a,1b,1c configured to be connected with the reader device 10a,10b,10c. According to some embodiments, the electronic device is a portable electronic device 1a. According to some embodiments, the electronic device is a local electronic device 1b. According to some embodiments the electronic device is a remote electronic device 1c. According to some embodiments, the electronic device 1a,1b,1c is configured to be connected to a communication network 60.

FIG. 5a illustrates an electronic device 1a in form of a smartphone, tablet, cellular phone, feature phone or any portable electronic device. In one example, as illustrated in FIG. 5a, the reader device 10a is the camera of a smartphone 1a. In the example, the electronic device 1a is a smartphone that is held by the machine operator when preparing tool parts 20a,20b,20c,20d for machine operation. The electronic device can also be a local electronic device 1b, e.g. installed as a part of a machine 50 as illustrated in FIG. 5b. In one example, illustrated in FIG. 5b, the reader device 10b is a stand-alone reader device connected to the electronic device 1b and installed as a part of the machine 50. According to some embodiments the electronic device is a remote server 1c connected to a reader device 10c via the communication network 60 as illustrated in FIG. 5c. In an example, the machine 50 is operated from a remote location e.g. within a factory.

According to some embodiments the communication network 60 is a wireless communication network. According to some embodiments, the wireless communication network is a standardized wireless local area network such as a Wireless Local Area Network, WLAN, Bluetooth™, ZigBee, Ultra-Wideband, UWB, Radio Frequency Identification, RFID, or similar network. According to some embodiments, the wireless communication network is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some embodiments, the wireless communication network can also be a combination of both a wireless local area network and a wireless wide area network. According to some embodiments, communication network 60 can be a combination of a wired communication network and a wireless communication network. According to some embodiments, the communication network 60 is defined by common Internet Protocols.

The electronic device 1a,1b,1c having a processing circuitry 102a,102b,102c configured to cause the system 100 to detect, by the reader device 10a,10b,10c, an identification marker 40a,40b,40c,40d at a tool part 20a,20b,20c,20d wherein the identification marker 40a,40b,40c,40d is a unique machine readable code.

The processing circuitry 102a,102b,102c is further configured to read, by the reader device 10a,10b,10c, the unique machine readable code of the identification marker 40a,40b, 40c,40d, and obtain from the unique machine readable code, individual dimension information data idID comprising at least one individually measured dimension of the tool part 20a,20b,20c,20d as measured when manufacturing the tool part 20a,20b,20c,20d.

According to some embodiments, the electronic device 1a,1b,1c further comprising a memory 103a,103b,103c. According to some embodiments, the individual dimension information data idID is stored in the memory 103a,103b, 103c.

Hence, with this embodiment an individual dimension, as measured when manufacturing the individual tool part, can be obtained using the reader device, and used during usage of the individual tool part, e.g. at a tool part customer, which eliminates the need for measuring the individual dimension of the tool part at a later point in time, as needed with a tool part only associated with a dimension value +/- a certain tolerance value, e.g. This saves time before and/or during usage of the tool part in a machine operation at a tool part customer, and also improves measurement accuracy and reduces measurement errors caused by e.g. a human operator.

According to some embodiments, the processing circuitry 102a,102b,102c is further configured to cause the system 100 to obtain machine dimension information data madID comprising at least a first assembly dimension defining a relation of the tool part 20a,20b,20c,20d to a machine 50 when the tool part 20a,20b,20c,20d is attached to the machine 50.

Hence, with this embodiment dimension information relating to the machine, an individual dimension of the tool part can be used in combination with a known dimension that is related to the machine when the tool part is assembled at the machine.

FIG. 4 illustrates example assembled tool parts 20a,20b, 20c,20d attached to a machine 50. According to some embodiments first tool part is attached to a machine 50 by a second tool part. According to some embodiments, a tool part is attached to a machine 50 by a tool holder 22. In the example in FIG. 4, tool parts 20a,20b,20c are attached at a tool holder 22, and the tool holder 22 is attached to the machine 50.

According to some embodiments, the machine dimension information data madID is obtained from a memory 103a, 103b,103c connectable to the processing circuitry 102a, 102b,102c.

According to some embodiments, the machine dimension information data madID is obtained via at least any of a manual input of the machine dimension information data madID via a user interface 400a,400b,400c of the electronic device 1a,1b,1c, or via an automatic input of the machine dimension information data madID by a machine 50 connectable to the electronic device 1a,1b,1c.

According to some embodiments, the machine dimension information data madID comprises a predetermined dimension relation and/or a predetermined angle relation of the tool part 20a,20b,20c,20d to a machine 50 when the tool part 20a,20b,20c,20d is attached to the machine 50.

According to some embodiments, the machine dimension information data madID comprises an angle relation to a predetermined machine reference axis of the machine AXm in relation to a predetermined tool reference axis AXt of the tool part 20a,20b,20c,20d. In the example as illustrated in FIG. 4, the tool part 20d has a predetermined tool reference axis AXt that is in the example shared with the machine reference axis AXm, and hence the angle relation to the predetermined machine reference axis of the machine AXm in relation to the predetermined tool reference axis AXt is zero degrees.

According to some embodiments, the machine dimension information data madID comprises a distance relation to a predetermined machine reference axis of the machine AXm in relation to a predetermined tool reference axis AXt of the tool part 20a,20b,20c,20d. In the example as illustrated in FIG. 4, there is no distance between the predetermined machine reference axis of the machine AXm and the predetermined tool reference axis AXt to the tool part 20d.

According to some embodiments, the processing circuitry 102a,102b,102c is further configured to cause the system 100 to determine first assembly dimension d of the tool part 20a,20b,20c,20d in relation to the machine 50, based on the first individual dimension information data 1idID and the machine dimension information data madID.

In an example, with reference to illustrated in FIG. 4, the distance between the predetermined machine reference axis of the machine AXm and the predetermined tool reference axis to the tool part 20c is the distance d to an assembly point of the tool part 20d where the tool part 20c is attached.

Hence, with this embodiment an individual dimension of the tool part can be used in combination with a known dimension that is related to the machine in order to determine a first assembly dimension of the tool part in relation to the machine, e.g. the position of the tool part in relation to the machine.

According to some embodiments, the processing circuitry 102a,102b,102c is further configured to cause the system 100 to detect, by the reader device 10a,10b,10c, a first identification marker 40c at a first tool part 20c and a second identification marker 40d at a second tool part 20d, read, by the reader device 10a,10b,10c, the unique machine readable code of the first identification marker 40c and the unique machine readable code of the second identification marker 40d. The processing circuitry 102a,102b,102c is further configured to obtain from the unique machine readable code of the first identification marker 40c a first individual dimension information data 1idID comprising at least one individually measured dimension of the first tool part 20c as measured when manufacturing the first tool part 20c, and obtain from the unique machine readable code of the second identification marker 40d a second individual dimension information data 2idID comprising at least one individually measured dimension of the second tool part 20d as measured when manufacturing the second tool part 20d. The processing circuitry 102a,102b,102c is further configured to determine a second assembly dimension L of the first tool part 20c and the second tool part 20d, based on the first individual dimension information data 1idID and the second individual dimension information data 2idID.

Hence, with this embodiment an assembly dimension of the first tool part and the second tool part can be determined, e.g. when the first tool part is attached to the second tool part.

In the example as illustrated in FIG. 4, the second assembly dimension L of the first tool part 20c and the second tool part 20d comprising the sum of the dimension d of the second individual dimension information data 2idID plus the dimension a of the first individual dimension information data 1idID.

According to some embodiments, the first tool part 20c is configured to be attached to the second tool part 20d, and the second tool part 20d is configured to be attached to a machine 50 and the processing circuitry 102a,102b,102c is further configured to cause the system 100 to determine a third assembly dimension of the first tool part 20c and the second tool part 20d in relation to the machine 50, based on the first individual dimension information data 1idID, the second individual dimension information data 2idID and the machine dimension information data madID.

In the example as illustrated in FIG. 4, the third assembly dimension of the first tool part 20c and the second tool part 20d comprising the sum of the dimension d of the second individual dimension information data 2idID plus the dimension a of the first individual dimension information data 1idID and in the example, the machine dimension information data madID defines the machine reference axis AXm to be common with the predetermined tool reference axis AXt of the second tool part 20d when the second tool part 20d is attached to the machine 50.

According to some embodiments, not illustrated, the first assembly dimension of the first tool part 20c and the second tool part 20d in relation to the machine 50, is further based on an offset distance q between the predetermined tool reference axis AXt and the predetermined machine reference axis of the machine AXm. According to some embodiments the offset distance q between the predetermined tool reference axis AXt and the predetermined machine reference axis of the machine AXm is obtained from a memory 103a,103b, 103c comprising tool and machine dimension data.

In another example, not illustrated, the machine dimension information data madID defines the machine reference axis AXm to be offset distance q from the predetermined tool reference axis AXt of the second tool part 20d when the second tool part 20d is attached to the machine 50, and the third assembly dimension in relation to the machine reference axis AXm is hence q+d+a.

Hence, with this embodiment an assembly dimension of the first tool part and the second tool part in relation to a machine can be determined when the first tool part is attached to the second tool part, and the second tool part is attached to the machine to e.g. determine a distance from a known reference point or axis of the machine to an edge of the first tool part.

In an example, with reference to FIG. 4, a machine operation by a tool part in form of a cutting insert 21c is used for removing chips from a piece of material 70 that is in a fixed position in relation to the machine 50. A certain location of the cutting edge of the cutting insert 21c in relation to the piece of material 70 is required. This location can be determined in relation to how the cutting insert 21c is located in relation to the machine 50 and/or in relation to the piece of material 70. With reference to FIG. 4, in an example, the location of the cutting edge of the cutting insert 21c in relation to the piece of material 70 is determined to be at a distance P between the piece of material 70 and a fixed machine reference point Mref. When replacing the cutting insert 21c, the same position in space of a new cutting edge of a new cutting insert, at the same distance P, in relation to the piece of material 70 is desired. When mounting the new cutting insert onto the tool holder 22 the distance P can be achieved by either using a new cutting insert with the very same dimensions as the previous cutting insert, or e.g. by adjusting the position of the machine reference axis AXm, by the machine 50, so that the new cutting edge of the new cutting insert is determined to be at a distance P between the piece of material 70 and the machine reference point Mref. In the example determining the distance P can be achieved by first knowing the second assembly dimension L of the cutting insert 21c and the tool holder 22, in relation to the machine 50. The relation to the machine 50 is based on the machine dimension information data madID, in this case related to the fixed machine reference point Mref. The first individual dimension information data 1idID of the new cutting insert, and the second individual dimension information data 2idID of the tool holder 22, is then used to adjust the position of the machine reference axis AXm, by the machine 50, so that the new cutting edge of the new cutting insert is determined to be at a position in space that is at a distance P between the piece of material 70 and the machine reference point Mref.

Figure 6A:
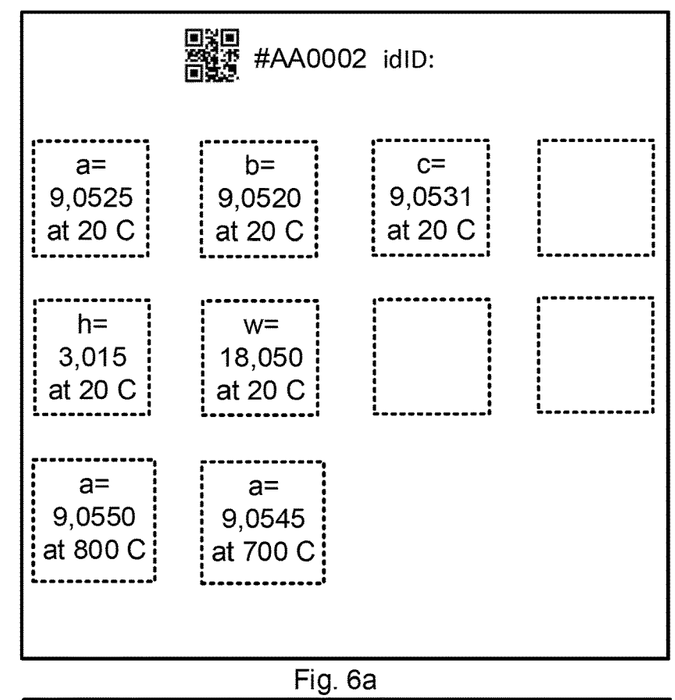
FIGS. 6a-6b illustrates example schematic data relations of associated individual dimension information data according to embodiments of the present disclosure.
Figure 6B:
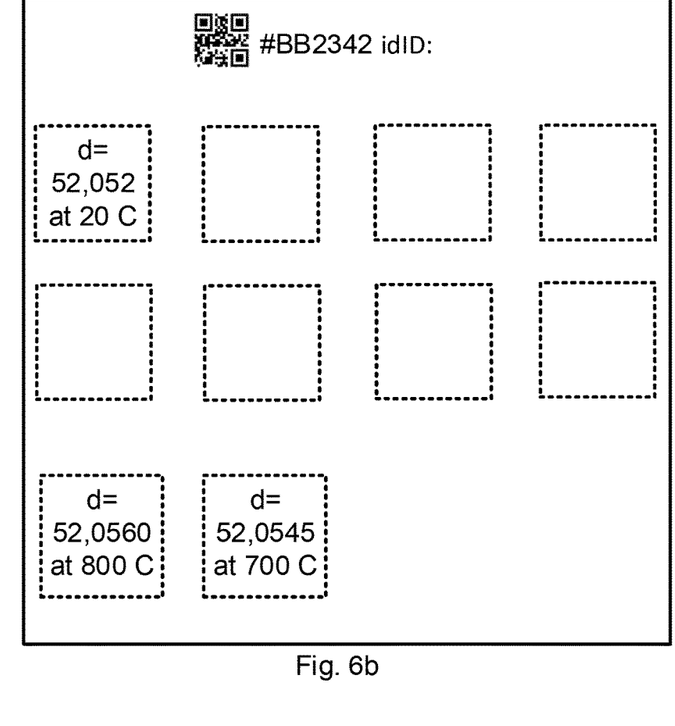

FIGS. 6a-6b illustrate example schematic data relations of associated individual dimension information data. FIG. 6a illustrates an example identification marker with the unique machine readable code of "AA0002". According to some embodiments, the individual dimension information data idID comprises plurality of individually measured dimensions of the tool part 20a,20b,20c,20d as measured when manufacturing the tool part 20a,20b,20c,20d. The example identification marker with the unique machine readable code of "AA0002" is associated with individual dimension information data idID, a=9,0525 mm at 20 degrees centigrade, b=9,0520 mm at 20 degrees centigrade, c=9,0531 mm at 20 degrees centigrade. The dimensions a, b and c are example of individually measured dimensions of the tool part 20a, 20b,20c,20d as measured when manufacturing the tool part 20a,20b,20c,20d.

According to some embodiments, the individually measured dimension of the tool part 20a,20b,20c,20d is a dimension at a certain temperature. In an example, the dimension of the tool part may vary dependent on the temperature of the tool part, e.g. the tool part may expand at a higher temperature. According to some embodiments, the individually measured dimension of the tool part 20a,20b, 20c,20d is a dimension at a certain temperature and/or a relation to a function for determining a dimension at a certain temperature. According to some embodiments, the expansion of a dimension of the tool part at a certain temperature is predetermined and part of the individual dimension information data idID. In FIG. 6a, the dimension a=9,0550 mm at 800 degrees centigrade and the dimension a=9,0545 mm at 700 degrees centigrade. This information can be used for determining the dimension when the tool part 20a,20b,20c,20d has a certain temperature.

FIG. 6b illustrates an example identification marker with the unique machine readable code of "BB2342". The example identification marker with the unique machine readable code of "BB2342" is associated with individual dimension information data idID d=52,052 mm at 20 degrees centigrade, d=52,0560 mm at 800 degrees centigrade and d=52,0545 at 700 degrees centigrade.

According to some embodiments, the system 100 comprises a temperature sensor device configured to determine the current temperature of the tool part 20a,20b,20c,20d, and the processing circuitry 102a,102b,102c is configured to cause the system 100 to obtain from the unique machine readable code, individual dimension information data idID comprising at least one individually measured dimension of the tool part 20a,20b,20c,20d as measured when manufacturing the tool part 20a,20b,20c,20d wherein the at least one individually measured dimension of the tool part 20a,20b, 20c,20d is further dependent to the current temperature of the tool part 20a,20b,20c,20d. According to some embodiments, the temperature sensor device is any of an infrared camera or a thermometer. According to some embodiments, the reader device 10a,10b,10c is configured to obtain the current temperature of the tool part 20a,20b,20c,20d.

According to some embodiments, the second tool part 20d has a predetermined tool reference axis AXt with a known relation to a predetermined machine reference axis of the machine AXm when the second tool part 20d is attached to the machine 50 that is comprised in the machine dimension information data madID. According to some embodiments the predetermined tool reference axis AXt is common with, perpendicular to, or parallel to the predetermined machine reference axis of the machine AXm.

According to some embodiments the predetermined machine reference axis of the machine AXm is defined by a rotation of the second tool part 20d when the second tool part 20d is inserted into the machine 50. According to some embodiments the reference axis of the machine AXm is defined by a rotation of a work piece that is inserted into the machine 50.

According to some embodiments the individual dimension information data idID is obtained by decoding the unique machine readable code of the identification marker 40a,40b,40c,40d and from the decoded information obtain the individual dimension information data idID.

Hence, with this embodiment information about the individual dimension can be coded and stored in the unique machine readable code itself that is available on the tool part.

According to some embodiments, the individual dimension information data idID is obtained by comparing the unique machine readable code with association data the system comprises individual dimension information data idID of the tool part 20a,20b,20c,20d provided with the unique machine readable code and obtaining the individual dimension information data idID from a memory 103a,103b, 103c.

Hence, with this embodiment, information about the individual dimension can be stored in a memory that e.g. is a remote memory 400c, and the information data idID can be stored and managed by a tool part manufacturer for a tool part customer.

According to some embodiments, the processing circuitry 102a,102b,102c is further configured to cause the system 100 to output the at least one individually measured dimension of the tool part 20a,20b,20c,20d as measured when manufacturing the tool part 20a,20b,20c,20d via a user interface 400a,400b,400c of the electronic device 1a,1b,1c.

According to some embodiments, the processing circuitry 102a,102b,102c is further configured to output the at least one individually measured dimension of the tool part 20a, 20b,20c,20d as measured when manufacturing the tool part 20a,20b,20c,20d as input data to a machine, connectable to the electronic device 1a,1b,1c, configured to perform an operation of the tool part 20a,20b,20c,20d.

According to some embodiments, the processing circuitry 102a,102b,102c is further configured to cause the system 100 to output a determined distance to a part of a tool part 20c based on the machine dimension information data madID via a user interface 400a,400b,400c of the electronic device 1a,1b,1c.

Figure 7:
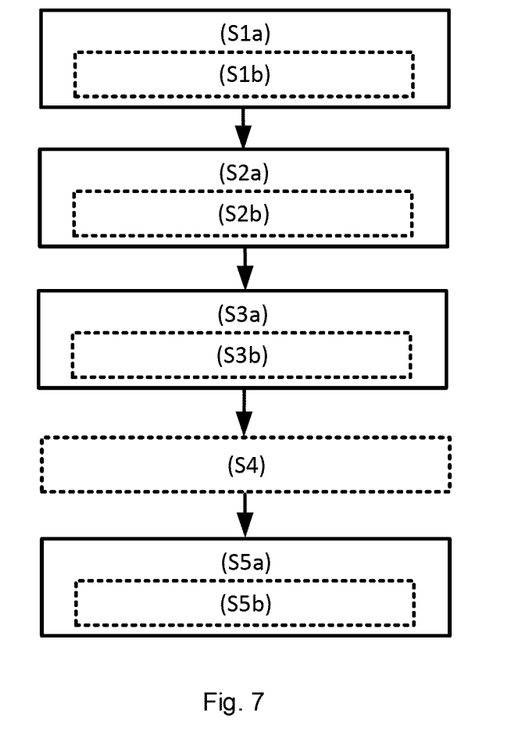
FIG. 7 illustrates a flow chart of example method steps according to embodiments of the present disclosure.

FIG. 7 illustrates a flow chart of example method steps according to an embodiment of the disclosure. The method comprises the step of S1a detecting, by a reader device 10a,10b,10c, an identification marker 40a,40b,40c,40d at a tool part 20a,20b,20c,20d wherein the identification marker 40a,40b,40c,40d is a unique machine readable code, the step of S2a reading, by the reader device 10a,10b,10c, the unique machine readable code of the identification marker 40a,40b, 40c,40d, and the step of S3a obtaining from the unique machine readable code individual dimension information data idID comprising at least one individually measured dimension of the tool part 20a,20b,20c,20d as measured when manufacturing the tool part 20a,20b,20c,20d.

Hence, with this embodiment each individual tool part is provided with a unique machine readable code which in turn can be associated with individual dimension information data idID for that specific individual tool part. This eliminates e.g. the need for measuring the dimension of the tool part 20a,20b,20c,20d at a later point in time e.g. during usage of the tool part in a machine.

According to some embodiments, the method further comprises the step of S4 obtaining machine dimension information data madID comprising at least a first assembly dimension defining a relation of the tool part 20a,20b,20c, 20d to a machine 50 when the tool part 20a,20b,20c,20d is attached to the machine 50.

Hence, with this embodiment dimension information relating to the machine, an individual dimension of the tool part can be used in combination with a known dimension that is related to the machine when the tool part is assembled at the machine.

According to some embodiments, the method further comprises the step of S5a determining first assembly dimension d of the tool part 20a,20b,20c,20d in relation to the machine 50, based on the first individual dimension information data 1idID and the machine dimension information data madID.

Hence, with this embodiment, an individual dimension of the tool part can be used in combination with a known dimension that is related to the machine in order to determine a first assembly dimension of the tool part in relation to the machine, e.g. the position of the tool part in relation to the machine.

According to some embodiments, the method further comprises the step of S1b detecting, by the reader device 10a,10b,10c, a first identification marker 40c at a first tool part 20c and a second identification marker 40d at a second tool part 20d, the step of S2b reading, by the reader device 10a,10b,10c, the unique machine readable code of the first identification marker 40c and the unique machine readable code of the second identification marker 40d. The method further comprises the step of S3b obtaining from the unique machine readable code of the first identification marker 40c a first individual dimension information data 1idID comprising at least one individually measured dimension of the first tool part 20c as measured when manufacturing the first tool part 20c, and obtaining from the unique machine readable code of the second identification marker 40d a second individual dimension information data 2idID comprising at least one individually measured dimension of the second tool part 20d as measured when manufacturing the second tool part 20d. The method further comprises the step of S5b determining a second assembly dimension L of the first tool part 20c and the second tool part 20d, based on the first individual dimension information data 1idID and the second individual dimension information data 2idID.

Hence, with this embodiment an assembly dimension of the first tool part and the second tool part can be determined, e.g. when the first tool part is attached to the second tool part.

According to some embodiments, the method further comprises the step of determining a third assembly dimension of the first tool part 20c and the second tool part 20d in relation to the machine 50, based on the first individual dimension information data 1idID, the second individual dimension information data 2idID and the machine dimension information data madID.

Hence, with this embodiment an assembly dimension of the first tool part and the second tool part in relation to a machine can be determined when the first tool part is attached to the second tool part, and the second tool part is attached to the machine to e.g. determine a distance from a known reference point or axis of the machine to an edge of the first tool part.

According to some embodiments, the individual dimension information data idID is obtained by decoding the unique machine readable code of the identification marker 40a,40b,40c,40d and from the decoded information obtaining the individual dimension information data idID, and/or by comparing the unique machine readable code with association data the method comprises individual dimension information data idID of the tool part 20a,20b,20c,20d provided with the unique machine readable code and obtaining the individual dimension information data idID from a memory 103a,103b,103c.

Hence, with this embodiment information about the individual dimension can be coded and stored in the unique machine readable code itself that is available on the tool part.

Further, with that information about the individual dimension being stored in a memory 103a,103b,103c, that is e.g. a remote memory 103c, is that the individual dimension can be managed by a tool part manufacturer for a tool part customer.

Figure 8:
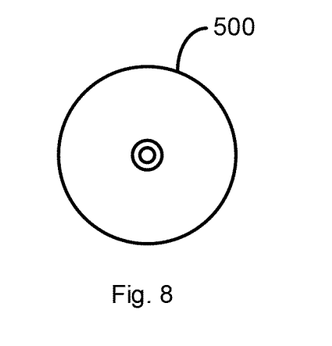
FIG. 8 illustrates an example computer program product according to embodiments of the present disclosure.

FIG. 8 illustrates a computer program product 500 according to a third aspect of this disclosure. The computer program product 500 comprises a non-transitory computer readable medium, having thereon a computer program comprising program instructions, the computer program being loadable into a processing circuitry 102a,102b,102c and configured to cause execution of the method when the computer program is run by the processing circuitry 102a, 102b,102c.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A system for utilizing an identification marker on a tool part to be used for determining a dimension of the tool part, the system comprising:
   a reader device arranged for reading a machine readable code;
   an electronic device configured to be connected with the reader device, the electronic device having a processing circuitry configured to cause the system to:

detect, by the reader device, an identification marker at a tool part wherein the identification marker is a unique machine readable code;

read, by the reader device, the unique machine readable code of the identification marker; and obtain from the unique machine readable code, individual dimension information data including at least one individually measured dimension of the tool part as measured when manufacturing the tool part, wherein the processing circuitry is further configured to cause the system to:

detect, by the reader device, a first identification marker at a first tool part and a second identification marker at a second tool part;

read, by the reader device, the unique machine readable code of the first identification marker and the unique machine readable code of the second identification marker;

obtain from the unique machine readable code of the first identification marker a first individual dimension information data including at least one individually measured dimension of the first tool part as measured when manufacturing the first tool part, and obtain from the unique machine readable code of the second identification marker a second individual dimension information data including at least one individually measured dimension of the second tool part as measured when manufacturing the second tool part; and determine a second assembly dimension of the first tool part and the second tool part, based on the first individual dimension information data and the second individual dimension information data.

2. The system according to claim 1, wherein the processing circuitry is further configured to cause the system to:

obtain machine dimension information data including at least a first assembly dimension defining a relation of the tool part to a machine when the tool part is attached to the machine.

3. The system according to claim 2 wherein the processing circuitry is further configured to cause the system to:

determine a first assembly dimension of the tool part in relation to the machine, based on the individual dimension information data and the machine dimension information data.

4. The system according to claim 1, wherein the processing circuitry is further configured to cause the system to:

obtain machine dimension information data including at least a first assembly dimension defining a relation of the first tool part to a machine and a second assembly dimension defining a relation of the second tool part to the machine when the first tool part is attached to the second tool part and the second tool part is attached to the machine; and determine a third assembly dimension of the first tool part and the second tool part in relation to the machine, based on the first individual dimension information data, the second individual dimension information data and the machine dimension information data.

5. The system according to claim 1, wherein the individual dimension information data is obtained by decoding the unique machine readable code of the identification marker and from the decoded information obtain the individual dimension information data.

6. The system according to claim 1, wherein the individual dimension information data is obtained by comparing the unique machine readable code with association data including individual dimension information data of the tool part provided with the unique machine readable code and obtaining the individual dimension information data from a memory.

7. A method for utilizing an identification marker on a tool part to be used for determining a dimension of the tool part, the method comprising:

detecting, by a reader device, an identification marker at a tool part, wherein the identification marker is a unique machine readable code;

reading, by the reader device, the unique machine readable code of the identification marker;

obtaining from the unique machine readable code individual dimension information data including at least one individually measured dimension of the tool part as measured when manufacturing the tool part;

detecting, by the reader device, a first identification marker at a first tool part and a second identification marker at a second tool part;

reading, by the reader device, the unique machine readable code of the first identification marker and the unique machine readable code of the second identification marker;

obtaining from the unique machine readable code of the first identification marker a first individual dimension information data comprising at least one individually measured dimension of the first tool part as measured when manufacturing the first tool part, and obtaining from the unique machine readable code of the second identification marker a second individual dimension information data including at least one individually measured dimension of the second tool part as measured when manufacturing the second tool part; and determining a second assembly dimension of the first tool part and the second tool part based on the first individual dimension information data and the second individual dimension information data.

8. The method according to claim 7, the method further comprising obtaining machine dimension information data including at least a first assembly dimension defining a relation of the tool part to a machine when the tool part is attached to the machine.

9. The method according to claim 8, the method further comprising determining a first assembly dimension of the tool part in relation to the machine, based on the individual dimension information data and the machine dimension information data.

10. The method according to claim 7, further comprising:

obtaining machine dimension information data including at least a first assembly dimension defining a relation of the first tool part to a machine and a second assembly dimension defining a relation of the second tool part to the machine when the first tool part is attached to the second tool part and the second tool part is attached to the machine; and determining a third assembly dimension of the first tool part and the second tool part in relation to the machine, based on the first individual dimension information data, the second individual dimension information data and the machine dimension information data.

11. The method according to claim 7, wherein the individual dimension information data is obtained by:

decoding the unique machine readable code of the identification marker and from the decoded information obtaining the individual dimension information data; and/or by comparing the unique machine readable code with association data comprising individual dimension information data of the tool part provided with the unique machine readable code and obtaining the individual dimension information data from a memory.

12. A computer program product comprising a non-transitory computer readable medium, having thereon a computer program having program instructions, the computer program being loadable into a processing circuitry and configured to, when the computer program is run by the processing circuitry, execute the method of:
- detecting, by a reader device, an identification marker at a tool part, wherein the identification marker is a unique machine readable code;
- reading, by the reader device, the unique machine readable code of the identification marker;
- obtaining from the unique machine readable code individual dimension information data including at least one individually measured dimension of the tool part as measured when manufacturing the tool part;
- detecting, by the reader device, a first identification marker at a first tool part and a second identification marker at a second tool part;
- reading, by the reader device, the unique machine readable code of the first identification marker and the unique machine readable code of the second identification marker;
- obtaining from the unique machine readable code of the first identification marker a first individual dimension information data comprising at least one individually measured dimension of the first tool part as measured when manufacturing the first tool part, and obtaining from the unique machine readable code of the second identification marker a second individual dimension information data including at least one individually measured dimension of the second tool part as measured when manufacturing the second tool part; and
- determining a second assembly dimension of the first tool part and the second tool part, based on the first individual dimension information data and the second individual dimension information data.

* * * * *